(12) United States Patent
Nicholas

(10) Patent No.: US 8,328,895 B2  
(45) Date of Patent: Dec. 11, 2012

(54) FILTER MEDIA PLEAT PACK RETENTION

(75) Inventor: Timothy John Nicholas, Hampshire (GB)

(73) Assignee: General Electric Company, Schenectady, NY (US)

(*) Notice: Subject to any disclaimer, the term of this patent is extended or adjusted under 35 U.S.C. 154(b) by 365 days.

(21) Appl. No.: 12/778,368

(22) Filed: May 12, 2010

(65) Prior Publication Data

US 2011/0277430 A1 Nov. 17, 2011

(51) Int. Cl.  
*B01D 46/00* (2006.01)

(52) U.S. Cl. .............. 55/483; 55/484; 55/497; 55/511; 55/DIG. 31

(58) Field of Classification Search .......... 55/483, 55/484, 490, 495, 497, DIG. 31, 511  
See application file for complete search history.

(56) References Cited

U.S. PATENT DOCUMENTS

| | | | |
|---|---|---|---|
| 2,966,959 A * | 1/1961 | Neumann | 55/484 |
| 4,999,038 A | 3/1991 | Lundberg | |
| 5,223,011 A * | 6/1993 | Hanni | 55/484 |
| 5,512,074 A * | 4/1996 | Hanni et al. | 55/484 |
| 5,543,047 A | 8/1996 | Stoyell et al. | |
| 6,152,980 A * | 11/2000 | Culwell | 55/481 |
| 6,294,004 B1 | 9/2001 | Summers et al. | |
| 6,485,538 B1 * | 11/2002 | Toyoshima | 55/490 |
| 6,916,352 B2 * | 7/2005 | Sutton et al. | 55/483 |
| 6,955,696 B1 | 10/2005 | Ost et al. | |
| 7,462,282 B2 | 12/2008 | Mees et al. | |
| 7,497,888 B2 * | 3/2009 | Ashwood et al. | 55/499 |
| 8,172,919 B1 * | 5/2012 | Ruiz et al. | 55/495 |
| 2001/0010297 A1 | 8/2001 | Pulek et al. | |
| 2002/0027102 A1 | 3/2002 | Robillard | |
| 2004/0060858 A1 | 4/2004 | Lucas et al. | |
| 2005/0139534 A1 | 6/2005 | Peet et al. | |
| 2006/0005517 A1 | 1/2006 | Sundet et al. | |
| 2008/0173579 A1 | 7/2008 | Oglesby | |
| 2008/0209875 A1 | 9/2008 | Treier et al. | |
| 2008/0272048 A1 | 11/2008 | Mei et al. | |

FOREIGN PATENT DOCUMENTS

EP 2116291 A1 11/2009

* cited by examiner

*Primary Examiner* — Robert Clemente  
(74) *Attorney, Agent, or Firm* — Hoffman Warnick LLC; Ernest G. Cusick (57) ABSTRACT

An approach that provides filter media pleat pack retention is described. In one embodiment, filter media pleat pack retention is attained by providing a filter media pleat pack having a joining member located between a first filter media portion and a second filter media portion. The first filter media portion is coupled to the joining member at one side and the second filter media portion is coupled to the joining member at an opposite side. The joining member provides stiffness to the filter media pleat pack and provides support to the panel stopping excessive bowing under high pressure and subsequent tearing and puncture.

19 Claims, 6 Drawing Sheets

FILTER MEDIA PLEAT PACK RETENTION

BACKGROUND OF THE INVENTION

The present invention relates generally to filtration and more particularly to an improved filter assembly for use in a gas turbine air intake system.

A gas turbine typically uses a large quantity of intake air for combustion. To maintain suitable performance of the gas turbine, the intake air is filtered to remove unwanted dust, moisture, and other contaminants that can damage components of the gas turbine. Typically, an array of filters is used to primarily filter the intake air supplied to the gas turbine.

A V-cell mini-pleat filter is one type of filter that may be used in a gas turbine air intake system. A typical V-cell mini-pleat filter has a series of paired flat panel filtration media arranged in a V-shape that are connected together at an apex. Over time, the V-cell mini-pleat filter suffers from a "bowing" condition of the flat panel filtration media that is primarily due to high pressure. In particular, high pressure across the flat panel filtration media causes the media to deflect or move in the direction of air flow. This deflection or movement can tear or puncture and damage the flat panel filtration media. A damaged flat panel filtration media adversely affects filtration performance resulting in a bypass of particulates into the gas turbine. In addition, a damaged flat panel filtration media adversely affects service life of the V-cell mini pleat filter.

BRIEF DESCRIPTION OF THE INVENTION

In one aspect of the present invention, a filter assembly is provided. The filter assembly comprises a filter frame having a pair of end caps separated by a plurality of spaced front rails and a plurality of spaced rear rails extending between the pair of end caps. Each of the pair of end caps has a plurality of channels formed thereacross to establish a predetermined shape. The plurality of front rails are located at one end of the plurality of channels on the pair of end caps and the plurality of rear rails are located at an opposite end of the plurality of channels on the pair of end caps. A plurality of filter media pleat packs are disposed in the filter frame. Each of the plurality of filter media pleat packs comprise a first filter media portion, a second filter media portion and a joining member located between the first filter media portion and the second filter media portion. The first filter media portion couples to the joining member at one side and the second filter media portion couples to the joining member at an opposite side. Each of the plurality of filter media pleat packs is disposed in one of the plurality of channels formed across the pair of end caps, abutting one of the plurality of front rails and one of the plurality of rear rails. The joining member is perpendicular to the front rail and the rear rail and parallel with the pair of end caps.

In another aspect of the present invention, a V-cell filter assembly is provided. In this aspect of the present invention, the V-cell filter assembly comprises a filter frame having a pair of end caps separated by a plurality of spaced front rails and a plurality of spaced rear rails extending between the pair of end caps. Each of the pair of end caps has a plurality of channels formed thereacross to establish a V-shaped pattern. The plurality of front rails are located at one end of the plurality of channels on the pair of end caps and the plurality of rear rails are located at an opposite end of the plurality of channels on the pair of end caps. A plurality of filter media pleat packs are disposed in the filter frame. Each of the plurality of filter media pleat packs comprises a first filter media portion, a second filter media portion and a joining member located between the first filter media portion and the second filter media portion. The first filter media portion couples to the joining member at one side and the second filter media portion couples to the joining member at an opposite side. Each of the plurality of filter media pleat packs is disposed in one of the plurality of channels formed across the pair of end caps, abutting one of the plurality of front rails and one of the plurality of rear rails, wherein the joining member is perpendicular to the front rail and the rear rail and parallel with the pair of end caps. The plurality of filter media pleat packs are disposed in the plurality of channels formed across the pair of end caps between the plurality of front rails and the plurality of rear rails form a V-cell filter.

In a third aspect of the present invention, a filter media pleat pack is provided. In this aspect of the present invention, the filter media pleat pack comprises a first filter media portion; a second filter media portion; and a joining member located between the first filter media portion and the second filter media portion. The first filter media portion couples to the joining member at one side and the second filter media portion couples to the joining member at an opposite side. The joining member has a first longitudinal groove and a second longitudinal groove separated by an interfacing member. The first longitudinal groove is positioned in an upward direction to accommodate the first filter media portion and the second longitudinal groove is positioned in a downward direction to accommodate the second filter media portion.

In a fourth aspect of the present invention, an air intake system for a gas turbine is provided. In this aspect of the present invention, the air intake system comprises an air intake housing; a filter assembly holding frame disposed in the air intake housing; and a plurality of filter assemblies supported by the filter assembly holding frame. Each filter assembly comprises a filter frame having a pair of end caps separated by a plurality of spaced front rails and a plurality of spaced rear rails extending between the pair of end caps. Each of the pair of end caps has a plurality of channels formed thereacross to establish a predetermined shape. The plurality of front rails are located at one end of the plurality of channels on the pair of end caps and the plurality of rear rails are located at an opposite end of the plurality of channels on the pair of end caps. A plurality of filter media pleat packs are disposed in the filter frame. Each of the plurality of filter media pleat packs comprises a first filter media portion, a second filter media portion and a joining member located between the first filter media portion and the second filter media portion. The first filter media portion couples to the joining member at one side and the second filter media portion couples to the joining member at an opposite side. Each of the plurality of filter media pleat packs is disposed in one of the plurality of channels formed across the pair of end caps, abutting one of the plurality of front rails and one of the plurality of rear rails, wherein the joining member is perpendicular to the front rail and the rear rail and parallel with the pair of end caps.

DETAILED DESCRIPTION OF THE INVENTION

Figure 1:
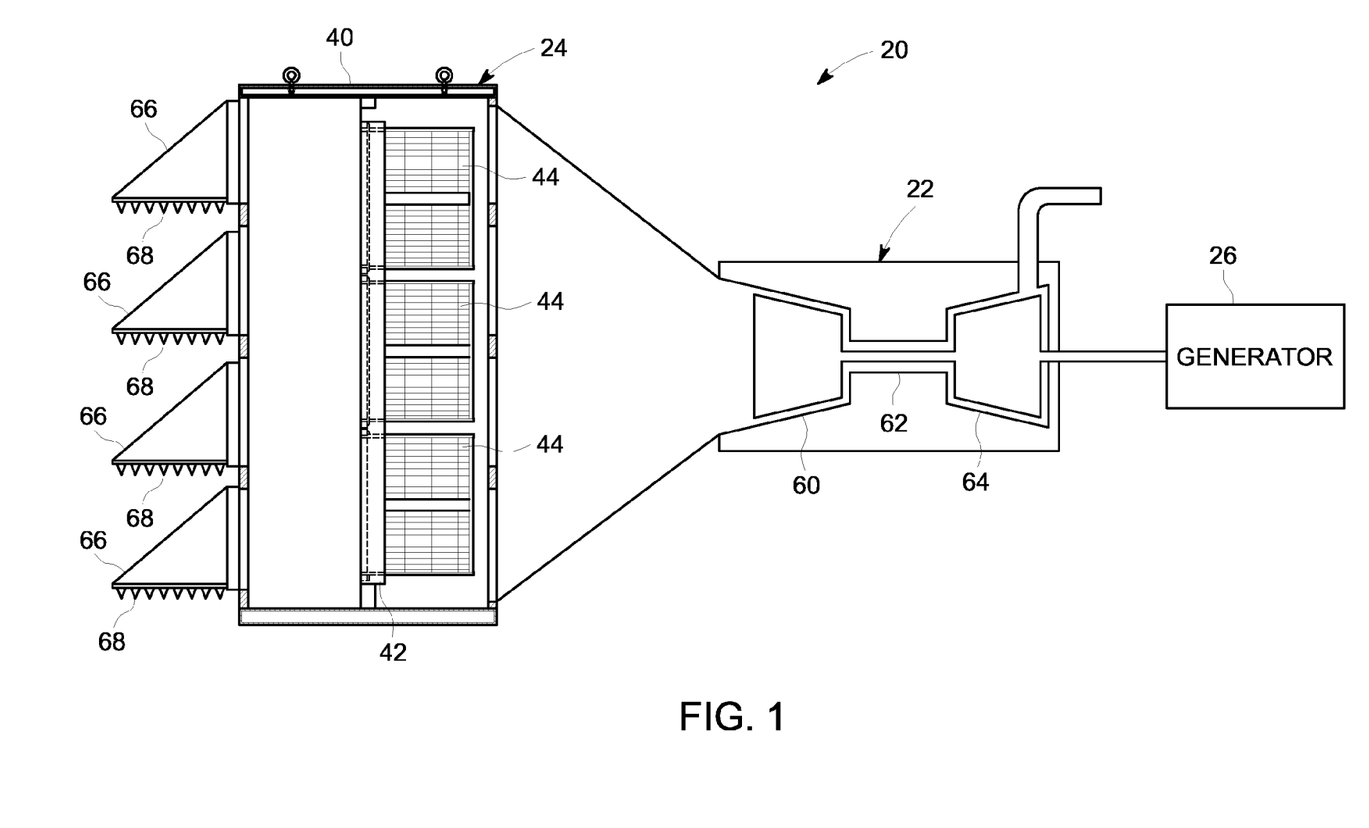
FIG. 1 is a schematic view of a filter assembly, constructed according to one embodiment of the present invention, for use with an air intake system of a gas turbine.

Referring to the drawings, FIG. 1 illustrates a power generation unit 20. The power generation unit 20 includes a gas turbine 22 and an intake air filter system 24. Although the description that follows is directed to a filter assembly used with a gas turbine, various embodiments of the present invention are suitable for use with other turbines such as steam turbines and wind turbines. Referring back to FIG. 1, air from the surrounding environment is drawn into intake air filter system 24 for filtration and delivery to gas turbine 22. Power generation unit 20 may be used in any of numerous applications, such as without limitation generating electrical power by means of a generator 26 or providing motive power, directly or indirectly.

Intake air filter system 24 includes an air intake housing 40. Air intake housing 40 may be made from any suitable material, such as sheet metal. A filter assembly holding frame 42 (FIG. 2) is disposed in air intake housing 40. Filter assembly holding frame 42 (FIG. 2) may be made from any suitable material, such as metal tubes, channels, beams or extrusions that are fixed to one another by suitable attachment means such as welding. Filter assembly holding frame 42 (FIG. 2) supports a plurality of filters or filter assemblies 44, according to one embodiment of the present invention. Filter assemblies 44 remove contaminants such as dust, dirt, moisture, salt, carbon and other contaminants from the air that may tend to reduce the performance or service life of gas turbine 22. In one embodiment, air intake housing 40 may be several stories high, and may contain up to several hundred filter assemblies 44, which may be held by several filter assembly holding frames 42.

As shown in FIG. 1, gas turbine 22 includes an air compressor section 60 that draws intake air into gas turbine 22 for combustion in a combustor section 62 and work in a turbine section 64. The air is drawn first from the surrounding environment through hoods 66 of the air intake housing 40. As the intake air enters air intake housing 40 through hoods 66, it may first pass through a prefilter or a de-mister 68. The air then flows through the array of filter assemblies 44 for primary or final filtration before it is directed to compressor section 60.

Figure 2:
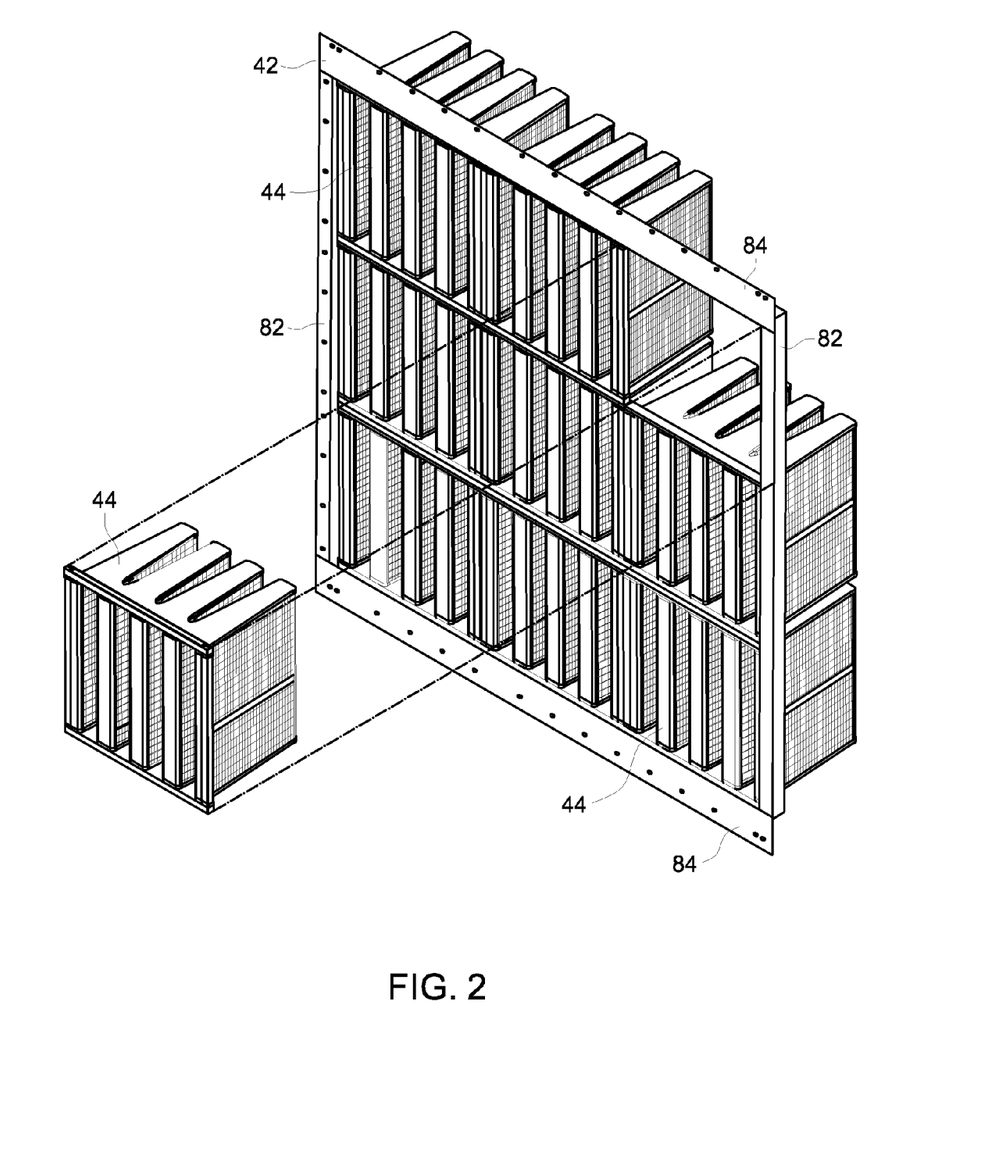
FIG. 2 is an enlarged perspective view of a portion of the air intake system illustrated in FIG. 1 according to one embodiment of the present invention.

As illustrated in FIG. 2, filter assembly holding frame 42 includes a set of vertical supports 82 and horizontal supports 84 that support an array of filter assemblies 44. Filter assemblies 44 may be held in place in filter assembly holding frame 42 by any suitable means, such as clamps or latches (not shown). Filter assemblies 44 may be any suitable filter type, such as for example, static V-cell mini-pleat filter cartridges. In one embodiment, filter assemblies 44 may be constructed as high-efficiency AltairSupernova™ filters, available from the General Electric Company. Furthermore, filter assemblies 44 may be of any suitable size, construction, configuration or material.

Figure 3:
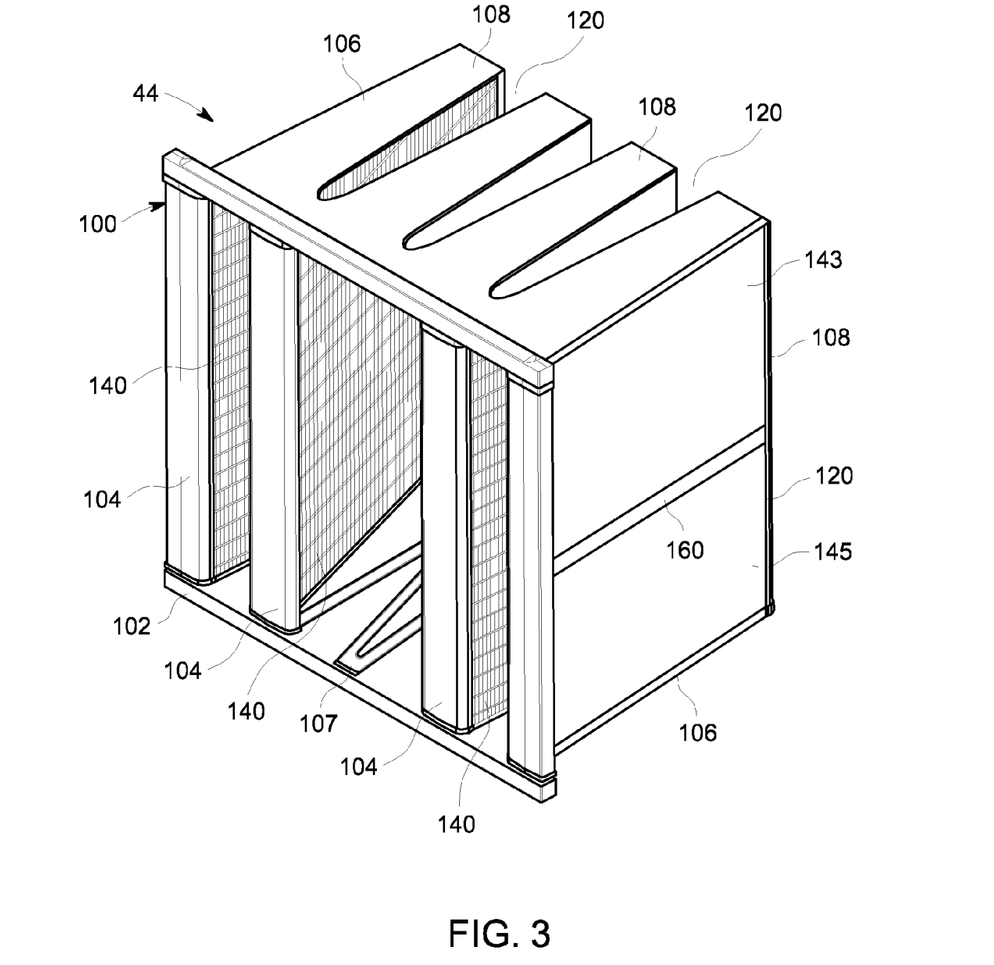
FIG. 3 is a perspective view of a filter assembly used in the air intake system illustrated in FIGS. 1-2 according to one aspect of the invention.
Figure 4:
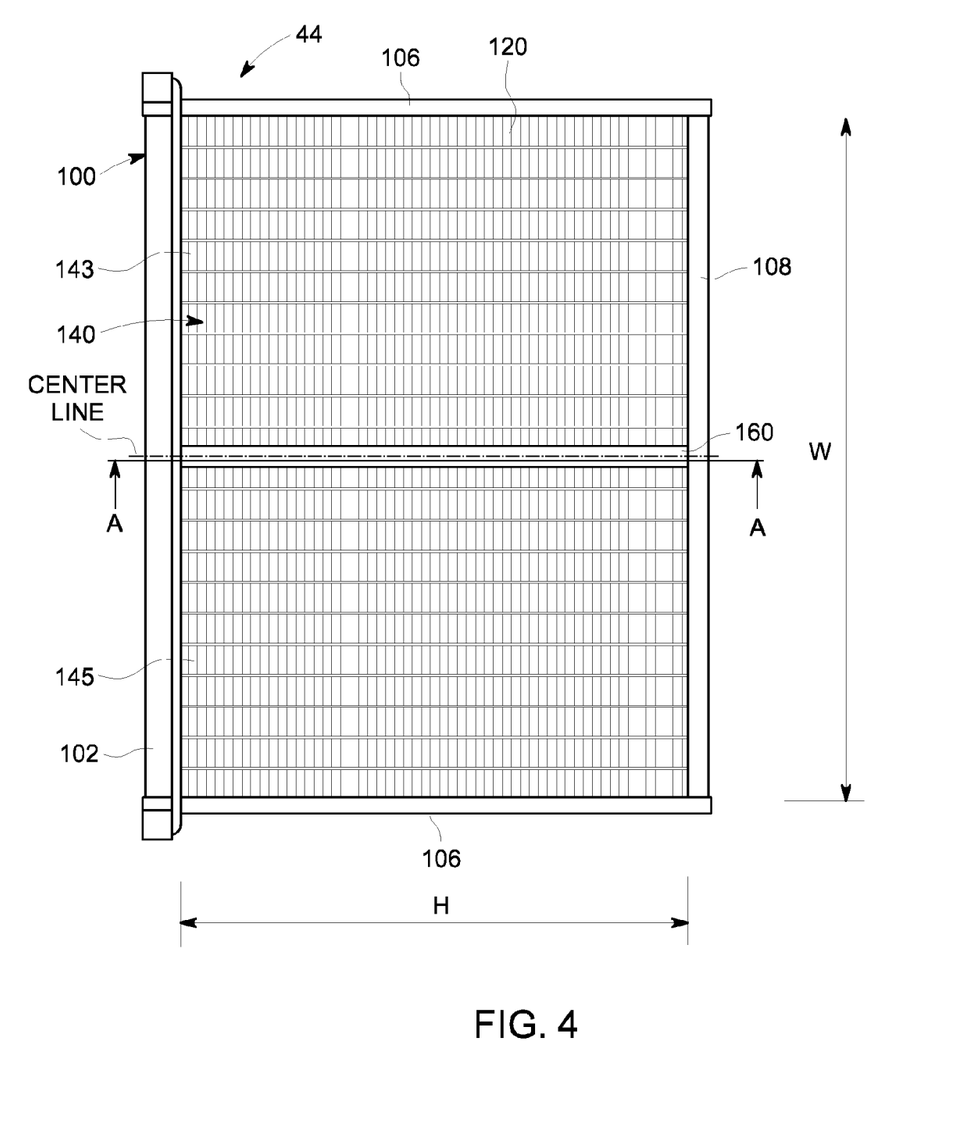
FIG. 4 is an elevation view of the filter assembly illustrated in FIG. 3 according to one embodiment of the present invention.

FIGS. 3 and 4 provide detailed views of filter assembly 44. In particular, FIG. 3 shows a perspective view of filter assembly 44, while FIG. 4 shows an elevation view of filter assembly 44. Each filter assembly 44 includes a filter frame 100 constructed according to one embodiment of the present invention. Filter frame 100 mounts filter assembly 44 in filter assembly holding housing frame 42. In one embodiment, filter frame 100 is made of injection molded plastic, however those skilled in the art will recognize that other materials may be used. Filter frame 100 has a flange 102 that is connectable with the filter assembly holding frame 42 to mount the filter assembly. A gasket (not shown) may be disposed around the periphery of the flange 102 and located between filter assembly 44 and the filter assembly holding frame 42 to provide an airtight seal between filter assembly 44 and filter assembly holding frame 42.

As shown in FIGS. 3 and 4, filter frame 100 includes a pair of side rails or "end caps" 106 that attach to and extend away from flange 102. End caps 106 are separated by a plurality of spaced front rails 104 and a plurality of spaced rear rails 108 (FIG. 3) extending between end caps 106. As shown in FIG. 3, front rails 104 extend between opposite sides of flange 102. Each of the pair of end caps 106 has a plurality of channels 107 formed thereacross to establish a V-shaped pattern. Front rails 104 are located at one end of the plurality of channels 107 and rear rails 108 are located at an opposite end of channels 107. In one embodiment, front rails 104 and rear rails 108 are connected to flange 102 by one of any well known fastening techniques.

Although not shown in FIGS. 3 and 4, each of front rails 104 and rear rails 108 has a longitudinal dividing section such as a channel 122 (FIGS. 6 and 7) that forms a pair of filter media pleat pack retention sections each configured to accommodate a filter media pleat pack 140. As explained below, in one embodiment, an adhesive material such as glue is placed in the filter media pleat pack retention sections of front rails 104 and rear rails 108 to filter media pleat packs 140. Those skilled in the art will recognize that other adhesive such as a hot-melt adhesive may be used.

Each filter media pleat pack 140 comprises a first filter media portion 143, a second filter media portion 145 and a joining member 160 located between first filter media portion 143 and second filter media portion 145. First filter media portion 143 couples to joining member 160 at one side and second filter media portion 145 couples to joining member 160 at an opposite side. Each filter media pleat pack 140 is disposed in one of the plurality of channels 107, so that it abuts a front rail 104 and a rear rail 108. Filter media pleat packs 140 are secured to channels 107 and filter media pleat pack retention sections of front rails 104 and rear rails 108 by a fastener such as for example, glue or other adhesives. In this configuration, joining member 160 is perpendicular to a front rail 104 and a rear rail 108, and parallel with end caps 106.

In this configuration, with the elements that form filter frame 100, a plurality of rectangular openings 120 are defined. That is, each assembly of a front rail 104, end caps 106 and a rear rail 108 define a respective rectangular opening 120. Each rectangular opening 120 has a width W (FIG. 4) in the range of about 20 inches (50.8 centimeters (cm)). Each rectangular opening 120 also has a height H in the range of about 10 inches (25.4 cm) to about 20 inches (50.8 cm) and preferably in the range of about 11 inches (27.9 cm) to about 18 inches (45.7 cm). It will be apparent that any suitable size of rectangular opening 120 may be used.

Figure 5:
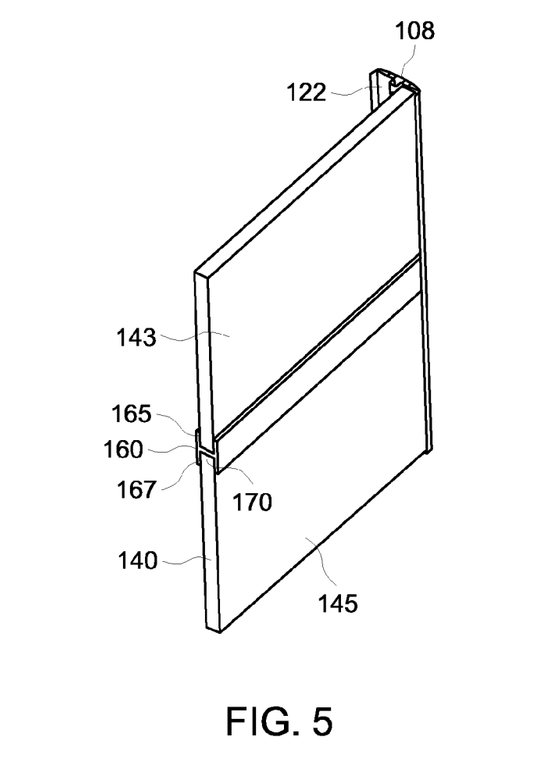
FIG. 5 is a perspective view of a portion of the filter assembly illustrated in FIG. 3 according to one embodiment of the present invention.
Figure 6:
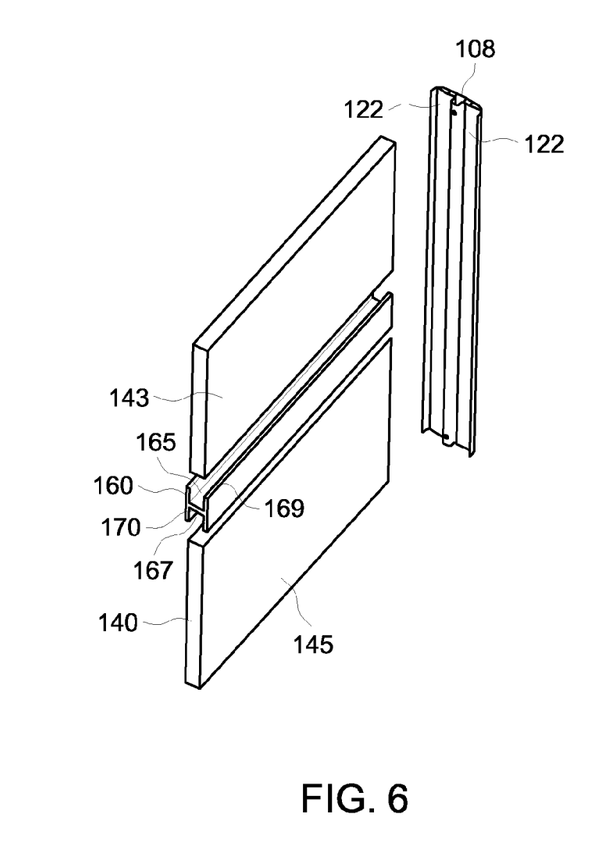
FIG. 6 is an exploded perspective view of the portion of the filter assembly illustrated in FIG. 5 according to one embodiment of the present invention.
Figure 7:
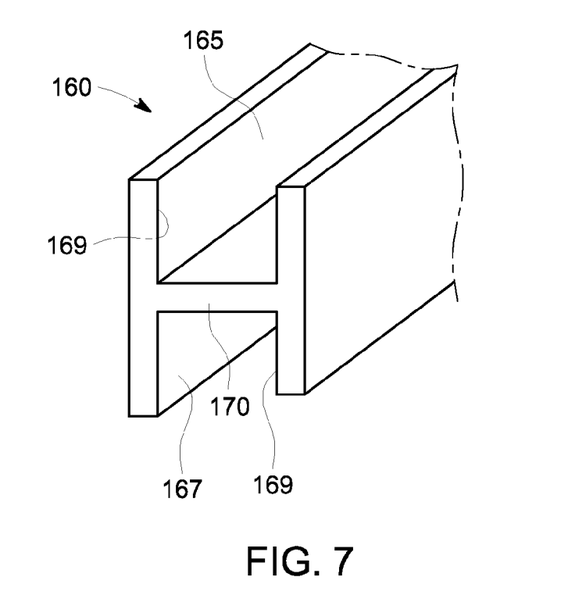
FIG. 7 is a perspective view showing an alternative configuration for a joining member used to provide stiffness and support for filter media portions of a filter media pleat pack according to one embodiment of the present invention.

FIGS. 5 and 6 provide more detailed views of filter media pleat pack 140 including first filter media portion 143, second filter media portion 145 and joining member 160. In particular, FIG. 5 shows a perspective view of first filter media portion 143, second filter media portion 145 and joining member 160 assembled in channel 122 of a rear rail 108, while FIG. 6 shows an exploded perspective view of these elements. In one embodiment, as shown in FIGS. 5 and 6, first filter media portion 143, second filter media portion 145 are in the form of a "flat panel" filter media, although it is conceivable that other types of filter media may be used with the various embodiments of the present invention. As shown in FIGS. 5 and 6, filter media pleat pack 140 is disposed in a respective channel 122 in rear rail 108. Although not shown in FIGS. 5 and 6, filter media pleat pack 140 extends across the entire rectangular opening 120 (FIGS. 3 and 4) in filter frame 100. First filter media portion 143 and second filter media portion 145 of filter media pleat pack 140 separate particles from a gas flowing through the pleat pack in a first direction of normal cleaning flow that is communicated to gas turbine 22. The filter media pleat pack 140 is made from any suitable material, such as micro-glass, however, those skilled in the art will recognize that other suitable materials such as, for example, polyester type microfibers may be used.

Joining member 160 as shown in FIGS. 5-6 comprises a first longitudinal groove 165 and a second longitudinal groove 167 separated by an interfacing member 170. First longitudinal groove 165 is positioned in an upward direction to accommodate first filter media portion 143 and second longitudinal groove 167 is positioned in a downward direction to accommodate second filter media portion 145. Although not shown in FIGS. 5 and 6, an adhesive material, such as for example, glue, is placed in first longitudinal groove 165 to secure first filter media portion 143 and in second longitudinal groove 167 to secure second filter media portion 145.

As shown in FIGS. 5 and 6, first longitudinal groove 165, second longitudinal groove 167 and interfacing member 170 form a joining member that is H-shaped. In one embodiment, H-shaped joining member 160 is symmetric, wherein first longitudinal groove 165 and second longitudinal groove 167 each has sidewalls 169 (FIG. 6) that are of equal dimensions. In another embodiment, H-shaped joining member 160 is nonsymmetric, wherein first longitudinal groove 165 and second longitudinal groove 167 each has sidewalls of unequal dimensions (FIG. 7) (e.g., an unequal H-shaped joining member).

Those skilled in the art will recognize that joining member 160 can have other shapes and that embodiments of the present invention are not limited to joining members that are only H-shaped. Any shaped joining member that can accommodate first filter media portion 143 and second filter media portion 145 and provide rigidity and stiffness to these media portions is suitable for use with the various embodiments of the present invention described herein.

Joining member 160 when coupled to first filter media portion 143 and second filter media portion 145 provides support and stiffness to filter media pleat pack 140 when assembled in channel 122 of front rail 104 and rear rail 108. The support and stiffness provided by joining member 160 stops excessive bowing that can arise under high pressure loads. As a result, the extra support stops tearing and punctures of the filter media due to the high pressure loads and enables filter media manufacturers to consider using less expensive filter media material in a filter media pleat pack.

As mentioned above, in one embodiment, filter assembly 44 is a V-cell mini-pleat filter. A typical V-cell filter assembly has eight filter media pleat packs 140 (e.g., two pleat packs disposed between a pair of front rails, for an assembly having four front rails). Because the various embodiments of the present invention use a filter media pleat pack 140 formed from first filter media portion 143 and second filter media portion 145, separated by joining member 160, the number of filter media pleat packs increases per V-cell filter. In one embodiment, a V-cell filter formed from filter media pleat packs having a first filter media portion and a second filter media portion separated by a joining member results in a V-cell filter having 16 pleat packs. Those skilled in the art will recognize, that another joining member could be added to a filter media pleat pack to increase the amount of pleat packs per V-cell filter assembly. In this embodiment, there would be a third and fourth filter media portion, which would result in a V-cell filter having 24 pleat packs.

The various embodiments of the present invention are not limited to use with only a V-cell filter. Those skilled in the art will recognize that embodiments of the present invention can be used with other filter assemblies that use groupings of multiple flat panels, interconnected groupings of panel and V-Bank units, and cylindrical type filters.

Those skilled in the art will recognize that further support and stiffness can be provided to filter media pleat pack 140 in addition to the support provided by joining member 160. In one embodiment, support member(s) may be applied across first filter media portion 143 and second filter media portion 145. In one alternative embodiment, the support members may include plastic or nylon mesh strips placed on first filter media portion 143 and second filter media portion 145 away from joining member 160.

Figure 8:
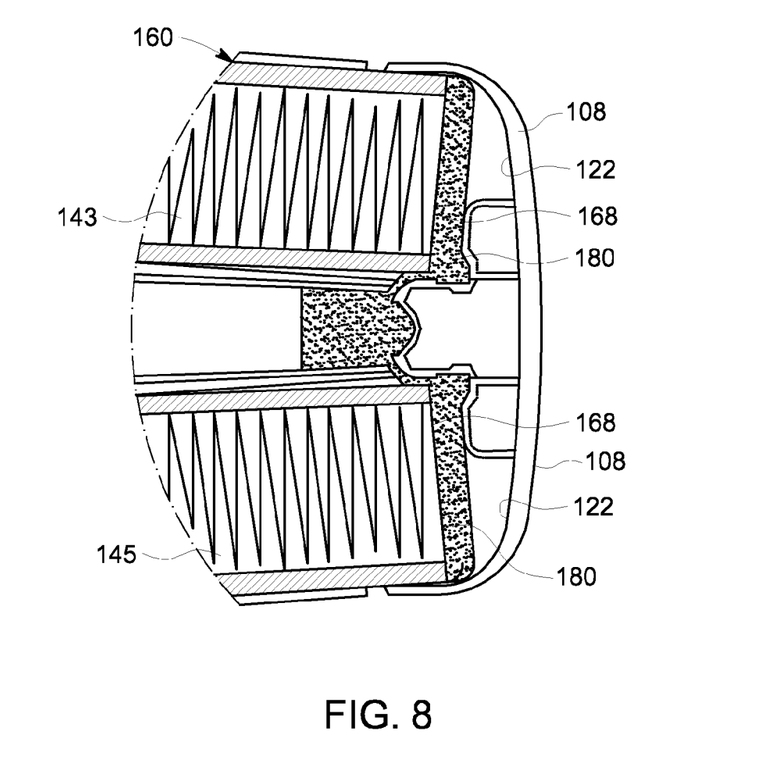
FIG. 8 is a an enlarged cross-sectional view of an end portion of the filter assembly taken along section A-A in FIG. 4 according to one embodiment of the present invention.

FIG. 8 shows a more detailed view of a filter media pleat pack 140 attached to channel 122 in a rear rail 108. In particular, FIG. 8 is an enlarged cross-sectional view taken along section A-A in FIG. 4 that shows an end portion of filter media pleat pack 140 including first filter media portion 143, second filter media portion 145 and joining member 160, attached to channel 122 of rear rail 108. As shown in FIG. 8, joining member 160 has an end portion 168 that is coupled to channel 122 in rear rail 108 and that is secured by an adhesive material 180 (e.g., glue).

Joining member 160 can be made of any suitable material for the environment that it will be used in, such as plastic or metal. For example, joining member 160 could be a molded plastic component. In another embodiment, joining member 160 could also be made from two metal components that are bonded together, such as by welding. In another embodiment, joining member 160 may be glued to an exit surface of filter media pleat pack 140.

Testing was done on a filter assembly 44 made according to one embodiment of the present invention and on a previously known filter assembly without a filter media pleat pack having a joining member coupling a first filter media portion and a second filter media portion. Testing showed that the filter media pleat pack 140 was substantially undamaged due to bowing when exposed to a force from gas flowing in the first direction at a differential gauge pressure across the filter media pleat pack of at least about 6 inches (15.24 cm) of water, preferably of at least about 12 inches (30.48 cm) of water and more preferably of at least about 15 inches (38.1 cm) of water. Testing also showed that without the filter media pleat pack 140 having a joining member 160 coupling a first filter media portion 143 and a second filter media portion 145, tears occurred in the filter media pleat pack due to bowing at about 6 inches (15.24 cm) of water.

It is known that during the service life of a filter assembly, the filter media pleat pack collects particulates from the air passing thorough it. This typically increases the pressure drop across the filter media pleat pack, which tends to increase the tendency to bow and cause damage. Providing a filter assembly 44 with the filter media pleat pack 140 having a joining member 160 coupling a first filter media portion 143 and a second filter media portion 145 as provided in the various embodiments of the present invention, increased service life of the filter assembly in the above-noted testing.

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A filter assembly, comprising:
a filter frame having a pair of end caps separated by a plurality of spaced front rails and a plurality of spaced rear rails extending between the pair of end caps, each of the pair of end caps having a plurality of channels formed thereacross to establish a predetermined shape, the plurality of front rails located at one end of the plurality of channels on the pair of end caps and the plurality of rear rails located at an opposite end of the plurality of channels on the pair of end caps; and
a plurality of filter media pleat packs disposed in the filter frame, each of the plurality of filter media pleat packs comprising a first filter media portion, a second filter media portion and a joining member located between the first filter media portion and the second filter media portion, the first filter media portion coupling to the joining member at one side and the second filter media portion coupling to the joining member at an opposite side, each of the plurality of filter media pleat packs disposed in one of the plurality of channels formed across the pair of end caps, abutting one of the plurality of front rails and one of the plurality of rear rails, wherein the joining member is perpendicular to the front rail and the rear rail and parallel with the pair of end caps.

2. The filter assembly according to claim 1, wherein the joining member comprises a first longitudinal groove and a second longitudinal groove separated by an interfacing member, the first longitudinal groove positioned in an upward direction to accommodate the first filter media portion and the second longitudinal groove positioned in a downward direction to accommodate the second filter media portion.

3. The filter assembly according to claim 2, further comprising an adhesive material placed in the first longitudinal groove to secure the first filter media portion and in the second longitudinal groove to secure the second filter media portion.

4. The filter assembly according to claim 2, wherein the first longitudinal groove, the second longitudinal groove and the interfacing member form an H-shaped joining member.

5. The filter assembly according to claim 4, wherein the H-shaped joining member is symmetric, wherein each of the first longitudinal groove and the second longitudinal groove has sidewalls of equal dimensions.

6. The filter assembly according to claim 4, wherein the H-shaped joining member is nonsymmetric, wherein each of the first longitudinal groove and the second longitudinal groove has sidewalls of unequal dimensions.

7. The filter assembly according to claim 1, wherein each of the plurality of front rails and the plurality of rear rails has a longitudinal dividing section forming a pair of filter media pleat pack retention sections each configured to accommodate a filter media pleat pack.

8. The filter assembly according to claim 7, comprising an adhesive material placed in the filter media pleat pack retention sections of the plurality of front rails and the plurality of rear rails to secure one of the plurality a filter media pleat packs thereto.

9. The filter assembly according to claim 1, wherein the predetermined shaped formed across each of the pair of end caps comprises a V-shape pattern, wherein the plurality of filter media pleat packs disposed in the plurality of channels between the plurality of front rails and the plurality of rear rails form a V-cell filter.

10. The filter assembly according to claim 1, wherein each of the plurality of filter media pleat packs comprises a flat panel configuration.

11. A V-cell filter assembly, comprising:
a filter frame having a pair of end caps separated by a plurality of spaced front rails and a plurality of spaced rear rails extending between the pair of end caps, each of the pair of end caps having a plurality of channels formed thereacross to establish a V-shaped pattern, the plurality of front rails located at one end of the plurality of channels on the pair of end caps and the plurality of rear rails located at an opposite end of the plurality of channels on the pair of end caps; and
a plurality of filter media pleat packs disposed in the filter frame, each of the plurality of filter media pleat packs comprising a first filter media portion, a second filter media portion and a joining member located between the first filter media portion and the second filter media portion, the first filter media portion coupling to the joining member at one side and the second filter media portion coupling to the joining member at an opposite side, each of the plurality of filter media pleat packs disposed in one of the plurality of channels formed across the pair of end caps, abutting one of the plurality of front rails and one of the plurality of rear rails, wherein the joining member is perpendicular to the front rail and the rear rail and parallel with the pair of end caps formed across the pair of end caps, wherein the plurality of filter media pleat packs disposed in the plurality of channels between the plurality of front rails and the plurality of rear rails form a V-cell filter.

12. The V-cell filter assembly according to claim 11, wherein the joining member comprises a first longitudinal groove and a second longitudinal groove separated by an interfacing member, the first longitudinal groove positioned in an upward direction to accommodate the first filter media portion and the second longitudinal groove positioned in a downward direction to accommodate the second filter media portion.

13. The V-cell filter assembly according to claim 12, further comprising an adhesive material placed in the first longitudinal groove to secure the first filter media portion and in the second longitudinal groove to secure the second filter media portion.

14. The V-cell filter assembly according to claim 12, wherein the first longitudinal groove, the second longitudinal groove and the interfacing member form an H-shaped joining member.

15. The V-cell filter assembly according to claim 14, wherein the H-shaped joining member is symmetric, wherein each of the first longitudinal groove and the second longitudinal groove has sidewalls of equal dimensions.

16. The V-cell filter assembly according to claim 14, wherein the H-shaped joining member is nonsymmetric, wherein each of the first longitudinal groove and the second longitudinal groove has sidewalls of unequal dimensions.

17. The V-cell filter assembly according to claim 11, wherein each of the plurality of front rails and the plurality of rear rails has a longitudinal dividing section forming a pair of filter media pleat pack retention sections each configured to accommodate a filter media pleat pack.

18. The V-cell filter assembly according to claim 17, comprising an adhesive material placed in the filter media pleat pack retention sections of the plurality of front rails and the plurality of rear rails to secure one of the plurality a filter media pleat packs thereto.

19. The V-cell filter assembly according to claim 11, wherein each of the plurality of filter media pleat packs comprises a flat panel configuration.

* * * * *